Jan. 12, 1932.  A. B. LOW  1,841,195
PISTON RING PACKING
Filed March 14, 1929  2 Sheets-Sheet 1

Inventor
Arthur B. Low
By
Attorney

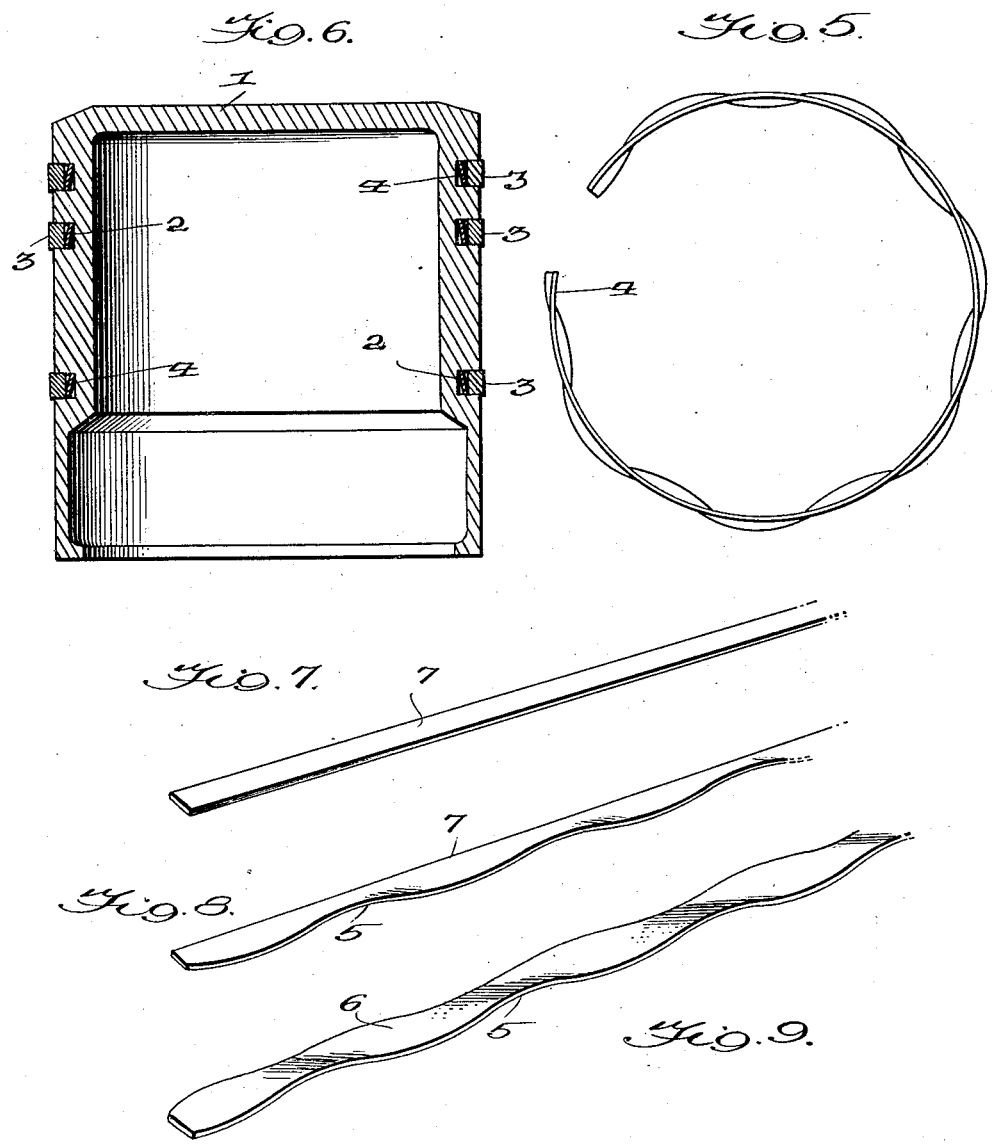

Patented Jan. 12, 1932

1,841,195

UNITED STATES PATENT OFFICE

ARTHUR B. LOW, OF DENVER, COLORADO

PISTON RING PACKING

Application filed March 14, 1929. Serial No. 346,982.

This invention relates to an improvement in piston ring packings.

The object of the invention is to hold and maintain the piston rings of the piston in close contacting engagement with the walls of the cylinder and to effectively seal the space behind the piston rings, so as to eliminate the pumping of oil into the compression chamber, to prevent piston-slap or the chatter of a loose fitting piston within the cylinder, to increase the compression charge, to conserve the expanded gases after ignition, to economize the use of oil and gasoline because of the use of lesser quantities and the maintenance of a proper compression, and to prevent the dilution of the crank case oil by preventing the passing of unburned portions or less volatile portions of the gasoline into the crank case along the walls of the cylinder.

The present invention is an improvement on my former Patent No. 1,640,155, of August 23, 1927, but is developed to conserve the time and material in the positioning of the packing behind the piston rings in order to maintain the proper tension on the latter.

The present invention effectively seals the space behind the piston ring as well as forcing the ring into contact with the cylinder, and is designed to give at least as good or better results in the maintaining of the proper tension on the piston rings, but accomplishing this result with only a single coil of a spring behind each piston ring. More than one coil may be used if desired but by the formation of the crimped edges in the spring packing, the latter is sufficiently resilient and compensating in its effect, so that one coil will be sufficient whereas it usually requires more than one coil in the form shown in my patent above referred to.

In the accompanying drawings:

Fig. 5 is a plan view of still another form of the invention;

Fig. 6 is a sectional view showing the packing applied to a piston;

Figs. 7, 8 and 9 are detailed perspective views showing the successive steps in the formation of the packing; and Fig. 10 is a sectional view, enlarged on line 10—10 of Fig. 1.

In the form of piston packing shown in my prior patent, the packing was constructed of ordinary spring steel which was rolled so that when brought into circular form, the diameter at one edge would be greater than the diameter at the other edge, thereby forming a packing in the general form of a truncated cone. Since the variation in the depths of the piston ring grooves and also the variation in the thickness of their corresponding rings are so great, it was necessary to use variable quantities of the bevelled springs to fill the spaces behind the piston rings. This called for considerable time and effort in lapping one coil over the other to secure the proper amount of tension on the piston rings.

It was in an effort to eliminate this lapping of the packing rings that the present invention was developed. While more than a single coil may be used if desired, nevertheless, it has been found that one coil will be sufficient to maintain the required tension and compensating effect on the piston rings, maintaining a tight fit between the rings and the walls of the cylinder, and at the same time effectively sealing the space behind the piston ring.

In the accompanying drawings, the construction of a piston of the usual type is shown in Fig. 6 and is designated generally by the numeral 1.

This piston is provided with the usual annular grooves 2 therein for receiving the piston rings 3, which are compressed in the annular grooves 2 and are adapted to bear against the walls of the cylinder for maintaining a tight and close fitting relation between the piston and cylinder to prevent compressed charges from escaping from the compression chamber and to eliminate the pumping of oil into the compression chamber.

Figure 1:
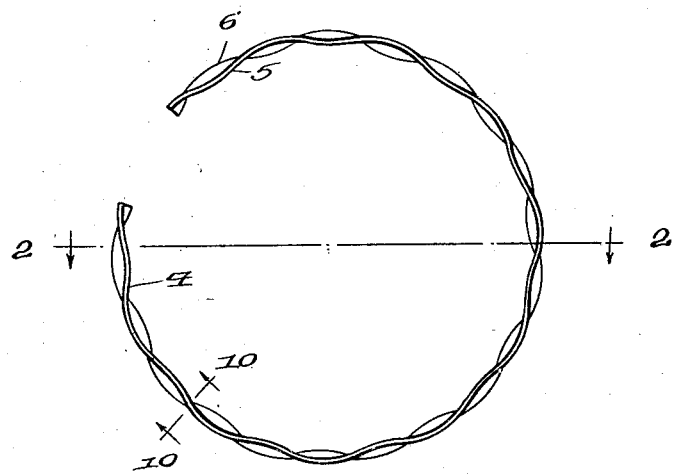
Fig. 1 is a plan view of one form of packing removed from a piston.
Figure 2:
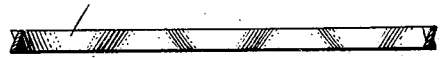
Fig. 2 is a sectional view therethrough on the line 2—2.

The piston ring packing is auxiliary to the piston rings 3 and is intended to apply additional tension to these rings for holding them in better contacting and close fitting relation against the walls of the cylinder, as well as to seal up the space behind the piston rings. This packing is designated generally by the numeral 4 in Figs. 1 and 2. It will be noted in Fig. 1 that the opposite edges of the packing is oppositely crimped as at 5 and 6, respectively, so as to provide the general serrated form shown in Fig. 1, but that only the edges are crimped relative to the central and body portion, and these are crimped relative to the body portion of the packing rather than being crimped in a general polygonal shape.

The formation of these crimped edges is illustrated in Figs. 7, 8 and 9. The packing is made of an initial strip of some spring material, such as spring steel, designated by the numeral 7 in Fig. 7. This has one edge 5 crimped in the manner shown in Fig. 8, after which the opposite edge 6 is crimped, as shown in Fig. 9, or both edges may be crimped simultaneously, if desired.

It will be noted that the crimps are opposite to each other so that when one edge is crimped outwardly the opposite edge at a corresponding point is crimped inwardly, the crimping of each edge extending toward or away from the transverse center of the ring. This provides an alternately and oppositely twisted or crimped spring packing, and when this crimped spring packing is again flattened out in position behind an extremely close fitting piston ring, the entire space required for the disposition of the spring packing is the thickness of the spring material itself, whereas in the bevelled or truncated cone shaped packing, shown in my prior patent, additional space was required behind the piston ring to accommodate the bevel thereof.

While the present invention may be applied to a packing of the truncated cone type, as referred to, it is preferable, however, to have it initially of a flat or non-bevelled type.

Figure 3:
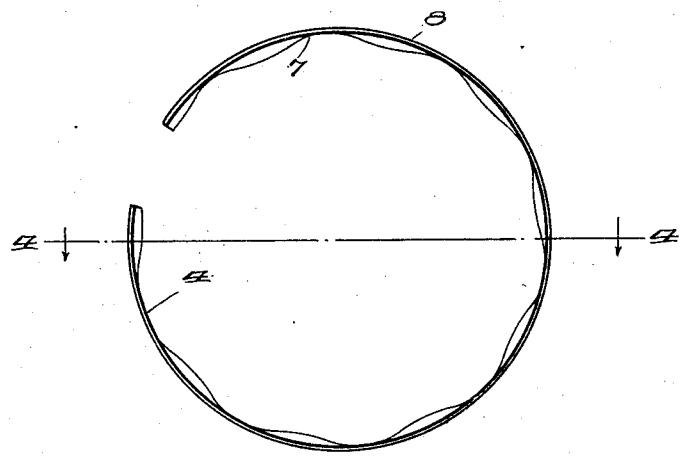
Fig. 3 is a plan view of a slightly modified form of packng.
Figure 4:
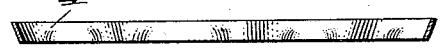
Fig. 4 is a sectional view therethrough on the line 4—4.

In the form shown in Figs. 3 and 4, only one edge 7 of the packing is crimped, which provides an apparently beveled construction, while the opposite edge 8 was of a true circular form. This may be further emphasized by actually forming the crimps in one edge of the bevelled type of packing, such as shown in my prior patent, if this should be desired.

In the form shown in Figs. 3 and 4, the crimps are all formed in the edge 7 and are bent inwardly only, out of the plane of the body portion of the ring and out of alignment with the uncrimped edge 8.

In Fig. 5, there is illustrated a similar form of packing provided with an uncrimped edge 9, but the opposite edge 10 is crimped or offset in alternate twists on both sides of the uncrimped edge 9. This arrangement would have the additional advantage of taking up more room behind a piston ring where the space behind the ring is extremely great. In this construction, however, it will be necessary that the crimped edge be longer than the other or uncrimped edge in order to allow for the crimping.

I am aware that various polygonal shaped and waved, Marcel packing rings have been used but these are not crimped at an angle from the plane of the spring and do not possess the advantages derived from the use of the present invention or the crimped packing rings. These polygonal shaped spring packings have the effect merely of forcing the piston ring out against the piston wall and reducing the piston slap or chatter. My packing ring with the crimped edge or edges not only holds the piston ring more positively against and in close contacting relation with the cylinder wall, cushioning the piston against slap, but in addition seals the space behind the piston ring, thereby preventing the leakage of oil and compression in worn cylinders.

In my invention, the crimp is out of a perpendicular plane when the packing is disposed in the piston in the usual relation, which effectively seals up the space behind the piston ring as well as maintaining the proper and required tension on the ring. The crimping of one or both of the edges only of the spring packing maintains the proper tension on the piston rings even if only a single coil of the spring is employed behind each ring. This likewise reduces the time and effort required to provide more than one coil of the spring in place behind the piston ring in the use of the bevelled form of packing, such as provided in my prior patent.

I claim:

1. A piston ring expander having a non-crimped main portion and an edge thereof crimped in undulations relative to the main portion of said expander.

2. A ring-like band spring packing expander for piston rings having a non-crimped main portion and at least one edge thereof crimped in undulations throughout the major portion of the circumference.

3. An annular shaped spring packing for piston rings having a non-crimped main portion and at least one edge thereof provided with wavy crimps offset from the body portion of the packing.

4. An annular spring packing for piston rings having the opposite edges thereof crimped in different directions relative to the general circumference of the packing, the crimping of each of the edges extending less than the entire width of the packing.

5. The combination of a piston having an annular groove therein, a piston ring disposed within said groove, and an annular resilient packing band interposed between the piston ring and inner wall of the groove and having a non-crimped main portion and edge portions thereof crimped or twisted in undulations relative to the body of the packing band.

6. An expanding packing for piston rings having a non-crimped main portion and edge portions thereof twisted in undulations out of the line of said packing.

7. An expanding packing for piston rings of approximately annular and non-sinuous shape, and having edge portions thereof twisted in undulations out of the line of the annular portion forming off-sets at intervals.

8. An expanding packing for piston rings of approximately annular and non-sinuous shape and having portions thereof at its edges oppositely waving out of line with the true circumference of the packing.

9. An expanding packing for piston rings of general annular and non-sinuous shape and having portions thereof at at least one edge off-set in undulations from the annular line of said packing.

10. An expanding packing for piston rings having sinuous edges, the sinuosities of one edge being staggered relative to the sinuosities of the other edge.

11. An expanding packing for piston rings or the like having a non-sinuous body portion, and sinuosities formed in an edge thereof.

12. The combination of a piston having an annular groove therein, a piston ring disposed in said groove, and an expanding packing interposed between the back face of the ring and the inner wall of the groove, to approximately seal the space behind the piston ring, said packing having a non-sinuous body portion, and sinuosities formed in an edge thereof.

13. The combination of a piston having an annular groove therein, a piston ring disposed in said groove, and an expanding packing interposed between the back face of the ring and the inner wall of the groove to approximately seal the space behind the piston ring, said packing having sinuous edges, the sinuosities of one edge being staggered relative to the sinuosities of the other edge.

In testimony whereof I affix my signature.

ARTHUR B. LOW.